S. T. SHELLENBERGER.
NUT LOCK.
APPLICATION FILED MAY 10, 1916.

1,206,262.

Patented Nov. 28, 1916.

Witness
J. L. Wright

Inventor
S. T. Shellenberger
By Victor J. Evans
Attorney

UNITED STATES PATENT OFFICE.

SPURGEON T. SHELLENBERGER, OF BRIDGEPORT, CONNECTICUT.

NUT-LOCK.

1,206,262.  Specification of Letters Patent.  Patented Nov. 28, 1916.

Application filed May 10, 1916.  Serial No. 96,645.

*To all whom it may concern:*

Be it known that I, SPURGEON T. SHELLENBERGER, a citizen of the United States, residing at Bridgeport, in the county of Fairfield and State of Connecticut, have invented new and useful Improvements in Nut-Locks, of which the following is a specification.

This invention relates to means for effectively locking a nut upon a bolt and resides in the construction, combination and operative arrangement of parts set forth in the following specification and falling within the scope of the appended claim.

Figure 1:
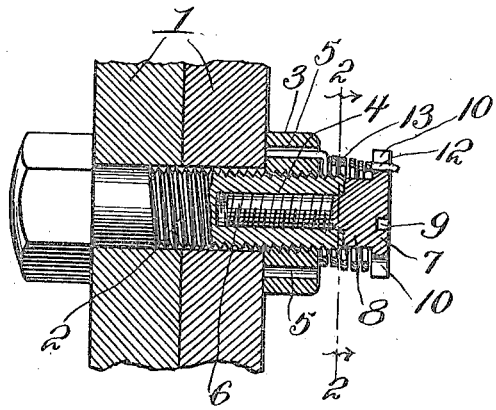
Figure 2:
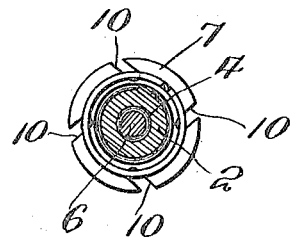
Figure 3:
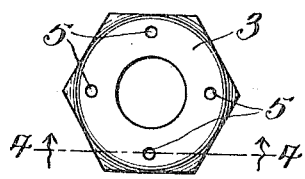
Figure 4:
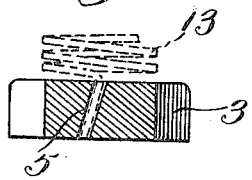
Figure 5:
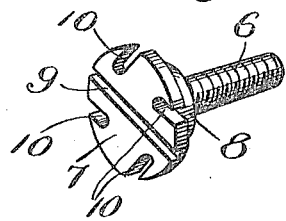

In the drawing: Figure 1 is an elevation, parts being shown in section, of a nut locked upon a bolt in accordance with the present invention, Fig. 2 is a sectional view approximately on the line 2—2 of Fig. 1, Fig. 3 is a face view of the nut, Fig. 4 is an enlarged sectional view approximately on the line 4—4 of Fig. 3, and Fig. 5 is a perspective view of the screw member.

In the drawing, 1—1 designate suitable plates which are adapted to be connected by a bolt 2 and a nut 3 which is threaded upon the said bolt. The bolt is of the ordinary construction but has the end of its shank centrally provided with a threaded depression 4 and the threads in the said depression are arranged at an opposite pitch from those upon the shank of the bolt. The nut 3 is also of the ordinary construction, but the same has a plurality of angularly disposed openings 5.

The threaded depression or bore 4 of the nut is adapted to receive a screw member 6 which is provided with a peripherally rounded flat head 7 and with an inner shoulder 8. The head 7 is provided with a transverse kerf 9 for the reception of a pointed instrument, such as a screw driver, whereby the member 6 may be screwed in the bore 4 of the bolt or removed from the said bore as desired. The head 7 is peripherally formed with spaced angularly disposed notches 10 and one of these notches is adapted to receive one of the bent ends 12 of the helical spring 13, the opposite end of the said spring being also bent and received in one of the angular openings of the nut 3.

In assembling the lock the nut 3 is first screwed home upon the bolt against one of the plates 1. The spring 13 is then arranged over the projecting shank of the bolt 2 and is wound around the said shank. Thereafter the screw member is threaded in the bore 4 of the bolt until one of its angular slots 10 is brought to proper alinement with the angular or bent end 12 of the said spring and the said spring is then permitted to enter the slot. As the threads of the screw are at a different pitch or angle from that of the threads of the bolt, 2, it will be noted that the coil spring 13 will have a tendency to turn the screw 6 in a homeward direction to bring its member 8 into tight contact with the end of the bolt 2, but the nut 3 may be readily removed from the bolt 2 by turning the screw 6 in an unscrewing direction.

I am aware that devices have been produced wherein the tension of a coil spring is provided between a nut and an element attached or co-acting with the bolt upon which the nut is threaded for holding the nut in a locked position upon the bolt, and therefore I make no broad claim to such structure, but What I do claim is:

The combination of a bolt having its shank provided with a threaded bore and the threads in the bore being pitched at a different angle from the threads of the bolt, a nut screwed upon the bolt and having angular openings, a screw member received in the threaded bore of the bolt, said screw having a shouldered end provided with a flat head, said head having its outer face provided with a transverse kerf and its periphery formed with angular slots, a coiled spring having angular ends received in one of the angular openings of the bolt, said spring being wound around the bolt and having its second angular end received in one of the slots in the head of the screw, all as and for the purpose set forth.

In testimony whereof I affix my signature.

SPURGEON T. SHELLENBERGER.

Witnesses:
M. J. RAFFENSBERGER,
N. B. DANNEN.

Copies of this patent may be obtained for five cents each, by addressing the "Commissioner of Patents, Washington, D. C."